US008941496B2

(12) United States Patent
Batra

(10) Patent No.: US 8,941,496 B2
(45) Date of Patent: Jan. 27, 2015

(54) LONG RANGE RFID DEVICE FOR BATTERY MONITORING AND SYSTEMS IMPLEMENTING SAME

(75) Inventor: Naresh Batra, Saratoga, CA (US)

(73) Assignee: Intelleflex Corporation, San Jose, CA (US)

(*) Notice: Subject to any disclaimer, the term of this patent is extended or adjusted under 35 U.S.C. 154(b) by 618 days.

(21) Appl. No.: 11/619,581

(22) Filed: Jan. 3, 2007

(65) Prior Publication Data

US 2008/0157924 A1 Jul. 3, 2008

(51) Int. Cl.
G08B 21/00 (2006.01)
H04W 52/02 (2009.01)
G06K 19/07 (2006.01)
G06K 19/077 (2006.01)

(52) U.S. Cl.
CPC ....... *H04W 52/0261* (2013.01); *G06K 19/0716* (2013.01); *G06K 19/07749* (2013.01); *H04W 52/0277* (2013.01)
USPC ...................... 340/572.1; 340/636.1; 320/136

(58) Field of Classification Search
USPC .......... 340/572.1, 10.1, 636.1, 661; 320/132, 320/134, 136
See application file for complete search history.

(56) References Cited

U.S. PATENT DOCUMENTS

| 5,894,266 | A | 4/1999 | Wood, Jr. et al. | 340/539 |
|---|---|---|---|---|
| 6,249,227 | B1 | 6/2001 | Brady et al. | 340/572.1 |
| 6,389,078 | B1 | 5/2002 | Hessel et al. | 375/259 |
| 6,726,099 | B2 | 4/2004 | Becker et al. | 235/380 |
| 6,791,463 | B2 * | 9/2004 | Iwasaki et al. | 340/636.1 |
| 6,895,450 | B2 | 5/2005 | Mahany et al. | 710/18 |
| 7,044,387 | B2 | 5/2006 | Becker et al. | 235/492 |
| 7,805,263 | B2 * | 9/2010 | Mack | 702/63 |
| 2002/0080938 | A1 | 6/2002 | Alexander, III et al. | 379/106.01 |
| 2002/0128051 | A1 | 9/2002 | Liebenow | 455/574 |
| 2003/0034898 | A1 | 2/2003 | Shamoon et al. | 340/825.72 |
| 2005/0006109 | A1 | 1/2005 | McSheffrey et al. | 169/75 |
| 2006/0012464 | A1 | 1/2006 | Nitzan et al. | 340/10.1 |
| 2006/0012481 | A1 | 1/2006 | Rajapakse et al. | 340/572.1 |
| 2006/0108421 | A1 | 5/2006 | Becker et al. | 235/451 |
| 2006/0130072 | A1 | 6/2006 | Rhoten et al. | 719/321 |
| 2006/0173259 | A1 | 8/2006 | Flaherty et al. | 600/331 |
| 2006/0175408 | A1 | 8/2006 | Becker et al. | 235/451 |

(Continued)

OTHER PUBLICATIONS

International Search Report and Written Opinion from PCT Application No. PCT/US07/26174 mailed on Apr. 24, 2008.

(Continued)

*Primary Examiner* — Jeffery Hofsass
(74) *Attorney, Agent, or Firm* — Zilka-Kotab, PC

(57) ABSTRACT

An RFID system according to one embodiment includes an electronic device being powered by a battery; an RFID device in electrical communication with the electronic device; and a mechanism for estimating a remaining potential energy of the battery, wherein a flag is set on the RFID device when an estimated remaining potential energy of the battery is below a predefined threshold. In an RFID system according to another embodiment, the RFID device stores an indication of a condition of the battery powering the electronic device. An RFID device according to yet another embodiment of the invention includes an interface for providing a direct physical connection to an electronic device that is powered by a battery; a memory for storing an indication of a condition of the battery powering the electronic device; and circuitry for sending the indication stored in the memory to a remote device via an air interface.

14 Claims, 11 Drawing Sheets

(56) References Cited

U.S. PATENT DOCUMENTS

| | | |
|---|---|---|
| 2006/0187041 A1 | 8/2006 | Olsen, III et al. .......... 340/572.1 |
| 2006/0200255 A1 | 9/2006 | Cenedese et al. ................ 700/20 |
| 2006/0200256 A1 | 9/2006 | Mason et al. ................... 700/65 |
| 2006/0265181 A1 | 11/2006 | Stewart ......................... 702/178 |

OTHER PUBLICATIONS

International Preliminary Report on Patentability from PCT Application No. PCT/US07/26174 mailed on Aug. 6, 2009.

* cited by examiner

LONG RANGE RFID DEVICE FOR BATTERY MONITORING AND SYSTEMS IMPLEMENTING SAME

FIELD OF THE INVENTION

The present invention relates to Radio Frequency Identification (RFID) systems and methods, and more particularly, this invention relates to systems and methods using RFID devices for indicating a condition of a battery powering peripheral electronic devices.

BACKGROUND OF THE INVENTION

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Addition of supplemental power to RFID tags, e.g., from a battery, has greatly increased the range in which reliable communication with the tag is possible. This has in turn made new applications possible.

One concern with self-powered electronic devices is the life of the battery. Battery-powered devices draw very little power when inactive or turned off, but draw orders of magnitude more power when active. If the electronic device has been activated many times, the battery will be used up more quickly than for a device activated less. Because certain electronic devices are active more often than others, depending upon the duty cycle of use and/or may simply draw more power than other devices, it is hard to estimate the battery life of a given electronic device. In a situation where there are many electronic devices, the current method is to replace all batteries when the battery on one of the electronic devices dies, as it is likely others will die soon as well. However, it is quite possible that many of the batteries may still have a reasonable useful operating life remaining. Thus it would be desirable to provide an indication of the condition of a battery of an individual electronic device.

SUMMARY OF THE INVENTION

A Radio Frequency Identification (RFID) system according to one embodiment of the present invention includes an electronic device being powered by a battery; an RFID device in electrical communication with the electronic device; and a mechanism for estimating a remaining potential energy of the battery, wherein a flag is set on the RFID device when an estimated remaining potential energy of the battery is below a predefined threshold.

An RFID system according to another embodiment of the present invention includes an electronic device being powered by a battery; and an RFID device in electrical communication with the electronic device, wherein the RFID device stores an indication of a condition of the battery powering the electronic device.

An RFID device according to yet another embodiment of the present invention includes an interface for providing a direct physical connection to an electronic device that is powered by a battery; a memory for storing an indication of a condition of the battery powering the electronic device; and circuitry for sending the indication stored in the memory to a remote device via an air interface.

A method for indicating a condition of a battery according to a further embodiment of the present invention includes estimating a remaining potential energy of a battery coupled to an electronic device; setting a flag on an RFID device when the estimated remaining potential energy of the battery is below a predefined threshold; and sending a state of the flag to a remote device via an air interface.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features to create a plethora of various possible combinations and permutations.

Unless otherwise specifically defined herein, all terms are to be given their broadest possible interpretation including meanings implied from the specification as well as meanings understood by those skilled in the art and as defined in dictionaries, treatises, etc.

Figure 1:
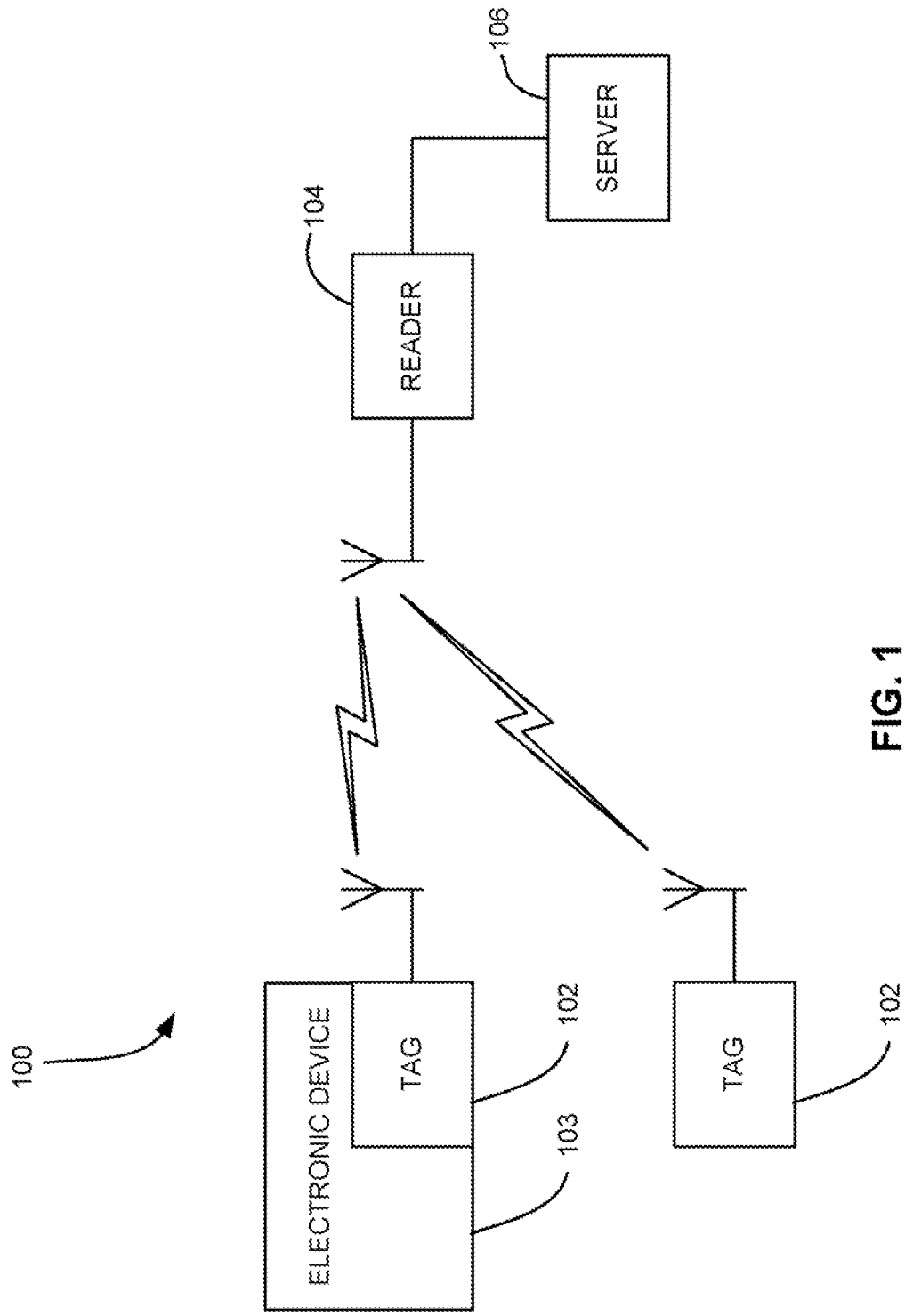
FIG. 1 is a system diagram of an RFID system.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include an application specific integrated circuit (ASIC), external memory module, etc. For purposes of the present discussion, the RFID devices 102 will be described as including a chip. An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

Each RFID device 102 may further include or be coupled to an antenna.

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a device, a person, etc. According to a preferred embodiment, at least one RFID device 102 is in electrical communication with an electronic device 103 via a direct physical connection, e.g., via a bus, wires, etc.

The electronic device 103 can be any type of electronic device, including but not limited to monitoring equipment such as sensors, anti-theft devices, graphical and textual display devices, printers, etc.

In one aspect, data (e.g., information, instructions, etc.) received by the RFID device from a remote device 104 is stored in the memory of the RFID device 102, the data being communicated to the electronic device 103 via the direct physical, connection. In another aspect, data initiating with the electronic device 103 is stored in the memory of the RFID device 102 for subsequent transmission to the remote device. Examples of communication between the devices are presented below.

The electronic device 103 may include a memory for storing data received from the RFID device memory.

As alluded to above, the direct physical connection can be any type of physical connection, and preferably allows bidirectional communication, but need not in all embodiments. Illustrative direct physical connections include one or more wires coupling the devices, a plug and socket arrangement, connections on a common printed circuit board, etc. In a preferred embodiment, a bus such as an industry-standard I²C or SPI interface is appended to the RFID device chip, with a complementary bus on the electronic device 103 positionable in contact with the RFID device bus, thereby allowing the electronic device 103 to communicate directly with the chip of the RFID device 102.

Figure 4A:
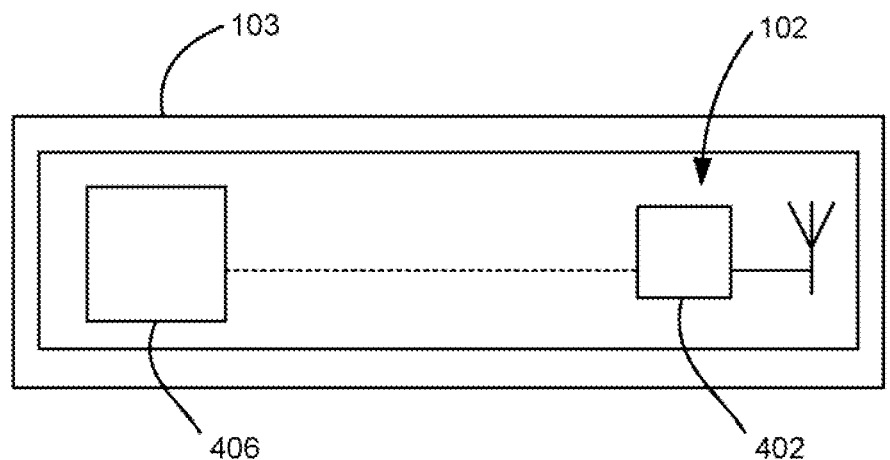
FIG. 4A is a system diagram of an electronic device in which a controller, e.g., chip, of an RFID device is located on a same printed circuit board as a controller of the electronic device.
Figure 4B:
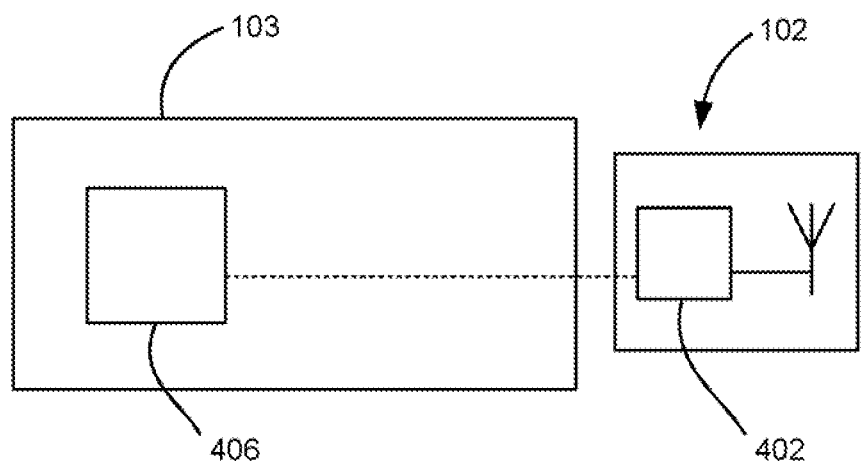
FIG. 4B is a system diagram of an electronic device and an RFID device external thereto.

In some embodiments, the RFID device 102 is not mounted to the electronic device 103. In other embodiments, the RFID device 102 is permanently or detachably mounted on the electronic device 103. In another aspect, the RFID device 102 is physically integrated with the electronic device 103. For example, FIG. 4A depicts an embodiment where the controller 402, e.g., chip, of the RFID device 102 is located on a same printed circuit board 404 as a controller 406 of the electronic device 103. In another example, the RFID device 102 may be positioned within a housing of the electronic device 103. FIG. 4B illustrates an embodiment where the RFID device 102 is external to the electronic device 103.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104 and/or electronic device 103.

The system 100 may also include an optional server 106 or other backend system which may include databases containing information and/or instructions relating to RFID tags and/or tagged items.

In a preferred embodiment, a long-range RFID tag is electrically coupled to an external device, and acts as a means of communicating data between the external device and an RFID reader. The external device can be a sensor, display, printer, etc. Data, instructions, etc. can be uploaded from the reader to the external device via the tag. For example, where the external device is a display, updated display data can be uploaded to the tag for download (via digital bus) and output on the external device.

Likewise, data can be downloaded from the external device to a reader via the tag. Thus, where the external device is a sensor, readings can be periodically downloaded.

Preferably, the RFID device 102 has sufficient memory to store the data, instructions, etc. so that the external device itself need not be in active communication with the remote device. Rather, the instructions are stored locally on the RFID device 102, for later download by the electronic device 103 coupled thereto.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UTD, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

Figure 2:
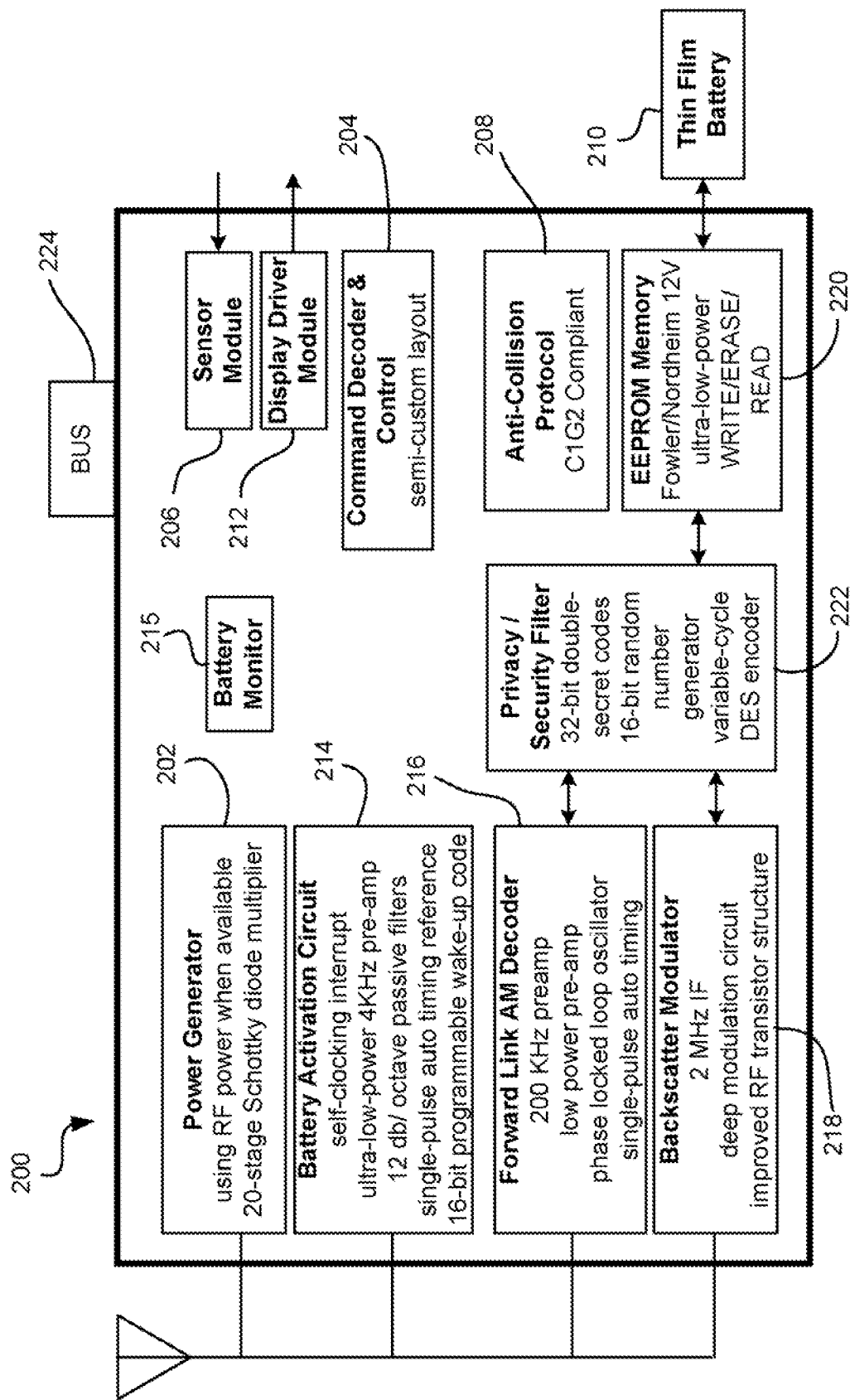
FIG. 2 is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires an only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

An external device can communicate directly with the chip by appending an interface or "bus" 224 such as an industry-standard I²C or SPI interface to the core chip. An illustrative bus 224 is a 2 pin I²C compliant bus coupled directly to the chip.

The RFID device may have a dedicated power supply, e.g. battery, may draw power from a power source of the electronic device (e.g., battery, AC adapter, etc.), or both. Further, the RFID device may include a supplemental power source. Note that while the following description refers to a "supplemental" power source, the supplemental power source may indeed be the sole device that captures energy from outside the tag, be it from solar, RF, kinetic, etc. energy.

Figure 3:
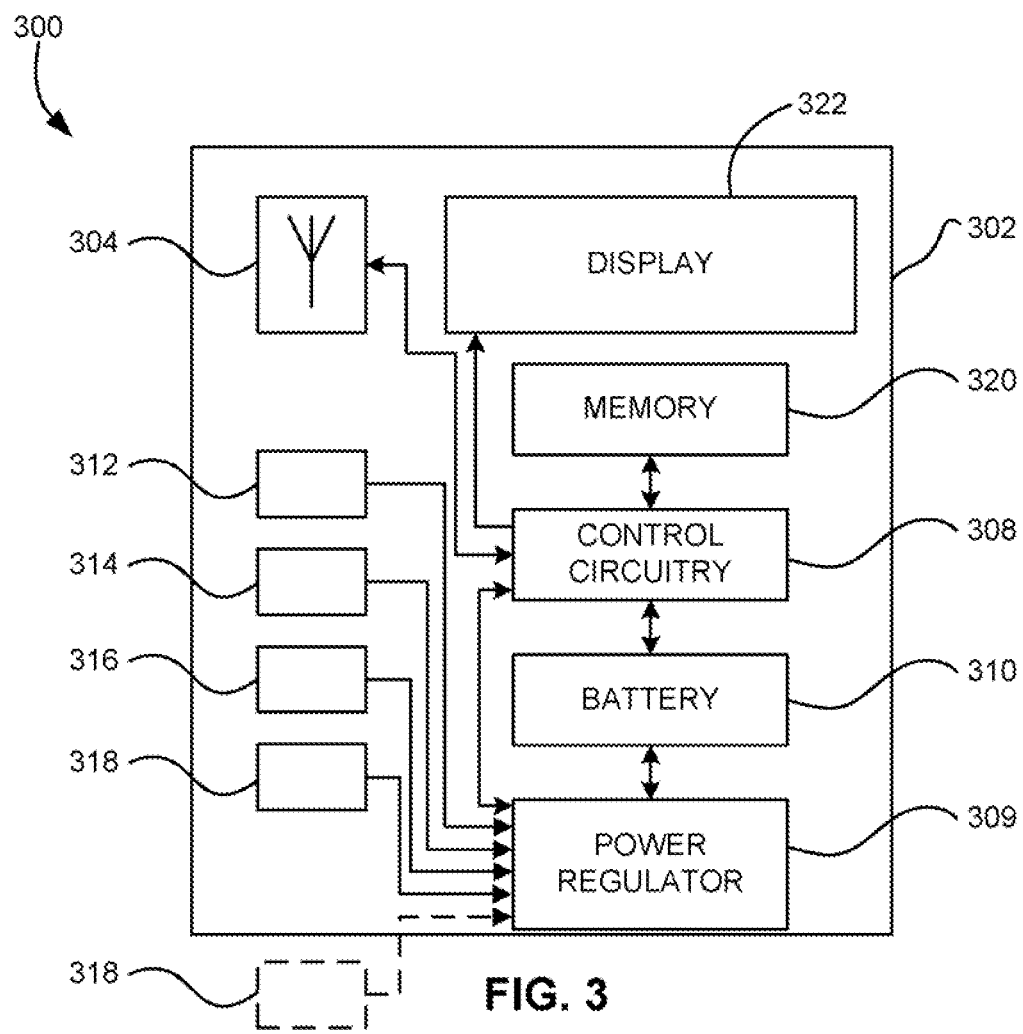
FIG. 3 is a system diagram of an RFID device according to one embodiment of the present invention.

FIG. 3 illustrates an RFID device 300 according to one embodiment of the present invention, here in the form of an RFID tag. As shown in FIG. 3, the tag 300 includes one or more antennae 304, a controller 308 coupled to a housing 302, power regulating circuitry 309, and a battery 310 (rechargeable or not rechargeable) for providing power to the control circuitry 200. The controller 308 may be embodied in a chip, such as part of the chip shown in FIG. 2.

An RF energy capture circuit, such as the power generation circuit 202 of FIG. 2, generates power from incoming RF waves. This acts as a power source for recharging the battery 310 (if applicable) and/or powering various components of the tag.

The RFID device may also draw power from the power source of the electronic device. For example, the communications interface may also provide a mechanism for transferring power from the electronic device power source to the RFID device. Alternatively, a separate power interface may be provided as a means for transferring power from the electronic device power source to the RFID device.

As shown in the embodiment of FIG. 3, one or more supplemental power sources 312-318 may be present (or present instead of the RF energy capture circuit) for recharging the battery 310 and/or powering the chip 200. The supplemental power source(s) may be any type of supplemental power source. Preferred supplemental power sources generate electricity from light (e.g., solar power), thermal energy, and/or kinetic energy. As shown in FIG. 3, illustrative supplemental power sources include a seismic transducer 312, piezoelectric transducer 314, acoustic transducer 316 and photovoltaic cells 318, each of which may also contain passive and/or low-power active circuits such as transformers, resistors and capacitors to condition the transducer outputs to match the input requirements of the recharging circuitry.

As FIG. 3 shows, seismic transducer 312, piezoelectric transducer 314, acoustic transducer 316 and/or photovoltaic cells 318 are used to either receive energy from a generating source or transmit energy, and couple that energy to the power regulator 309. All of the transducers, (312, 314, 316, 318) are capable of generating and transmitting their own energy which will prove advantageous to the various embodiments in which implemented. Any one of the above mentioned devices or any combination thereof may be used to present energy in the form of an alternating current (A.C.) or direct current (D.C.) voltage to power regulator 309.

To conserve power, the RFID device may enter a hibernation state during at least some periods when the RFID device is not actively communicating with the electronic device or the remote device. In brief, various circuitry of the RFID device may be placed in a hibernation state during periods of inactivity to conserve power. A hibernation state may mean a low power state, or a no power state. Upon receiving a valid activation signal or command, some or all of the circuitry may then be activated to perform some function.

In one aspect, the electronic device selectively wakes the RFID device from a hibernation state, such as for uploading data to the RFID device memory, checking the RFID device for updated data (e.g., to scan the memory, check whether a flag is set or not set, etc.), etc. Preferably, the circuitry is activated upon receiving an activation signal from the electronic device and prior to receiving data from the electronic device.

Similarly, the remote device, e.g., reader may selectively wake the RFID device from a hibernation state. For uploading data to the RFID device memory, checking the RFID device for updated data (may scan the memory, or check whether a flag is set or not set), etc. Preferably, circuitry is activated upon receiving an activate command from the remote device and prior to sending the data to the remote device.

Any type of activation circuit, logic, or instruction set known in the art may be used to coordinate activation, or exit from a hibernation state. With continued reference to FIG. 2, an illustrative battery activation circuit 214 is shown present on the illustrative chip 200. The battery activation circuit 214 remains active and processes incoming signals to determine whether any of the signals contain an activate command or other signal indicating that the chip 200 should exit the hibernation state. If one signal does contain a valid activate command, additional portions of the chip 200 are wakened from the hibernation state, and communication with the reader can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210. While any type of battery activation circuit known in the art can be potentially integrated into the system, an illustrative battery activation circuit 214 is described in copending U.S. patent application Ser. No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

As discussed above, standard RFID protocols are preferably used to enable communication between the remote device and the RFID device. Similarly, standard RFID protocols and/or variants thereof may be used to enable communication between the RFID device and electronic device in communication therewith. In such embodiments, the RFID device controller may then not need additional circuitry to communicate in a second protocol. In other aspects, however, the RFID device may communicate with the electronic device via another type of communication protocol, which may or may not require additional circuitry on the RFID device to enable communication via said protocol.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 5:
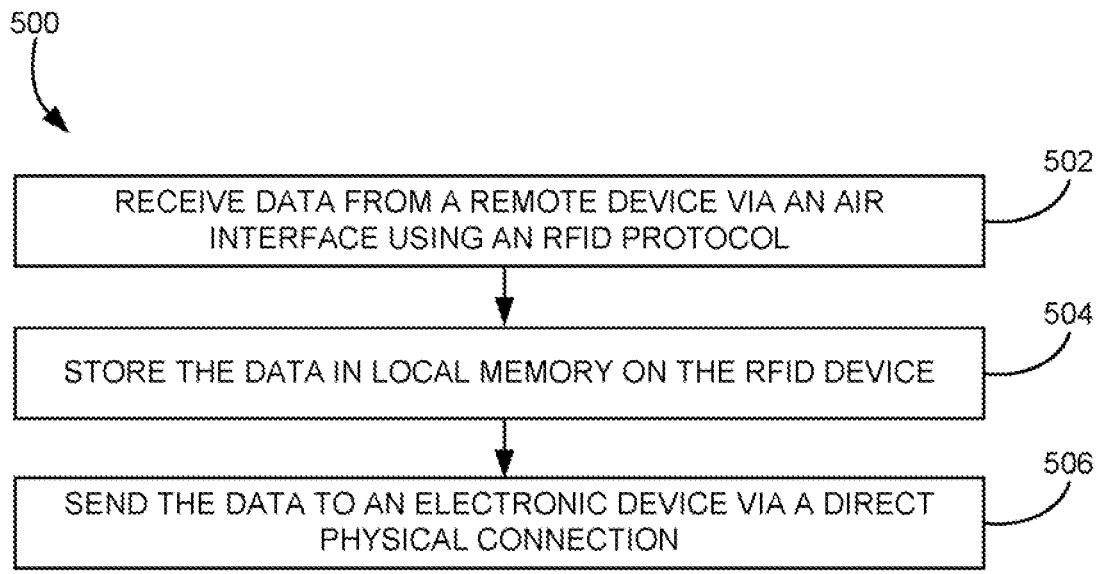
FIG. 5 is a process diagram of a method for communication between an electronic device and a remote device according to one embodiment of the present invention.

FIG. 5 depicts a method 500 for communication between an electronic device and a remote device according to one embodiment. In operation 502, an RFID device receives data from a remote device via an air interface using a RFID protocol. In operation 504, the data is stored in local memory on the RFID device. The data is sent to an electronic device via a direct physical connection in operation 506.

As an option, a flag may be set on the RFID device, indicating that data has been written to the local memory of the RFID device. The electronic device may then merely check the flag to determine whether the RFID device has data thereon. In one embodiment, the flag is set by setting a single bit (or several bits) in memory to a particular state. The electronic device may then read the memory of the RFID device to determine whether the flag is set or not. In another embodiment, the flat is set by periodically or continuously sending out a signal. In a further embodiment, the flag is a mechanical mechanism. Once the data is transferred to the electronic device, the flag can be reset.

In one approach, communication between a remote device and an electronic device attached to the RFID device operates in a mailbox system. A pin on the bus can be programmed to bring out an internal signal used when the system is writing to internal memory of the RFID device. This can be used as the flag on the mailbox to tell the attached electronic device that the remote device has written into memory.

Figure 6:
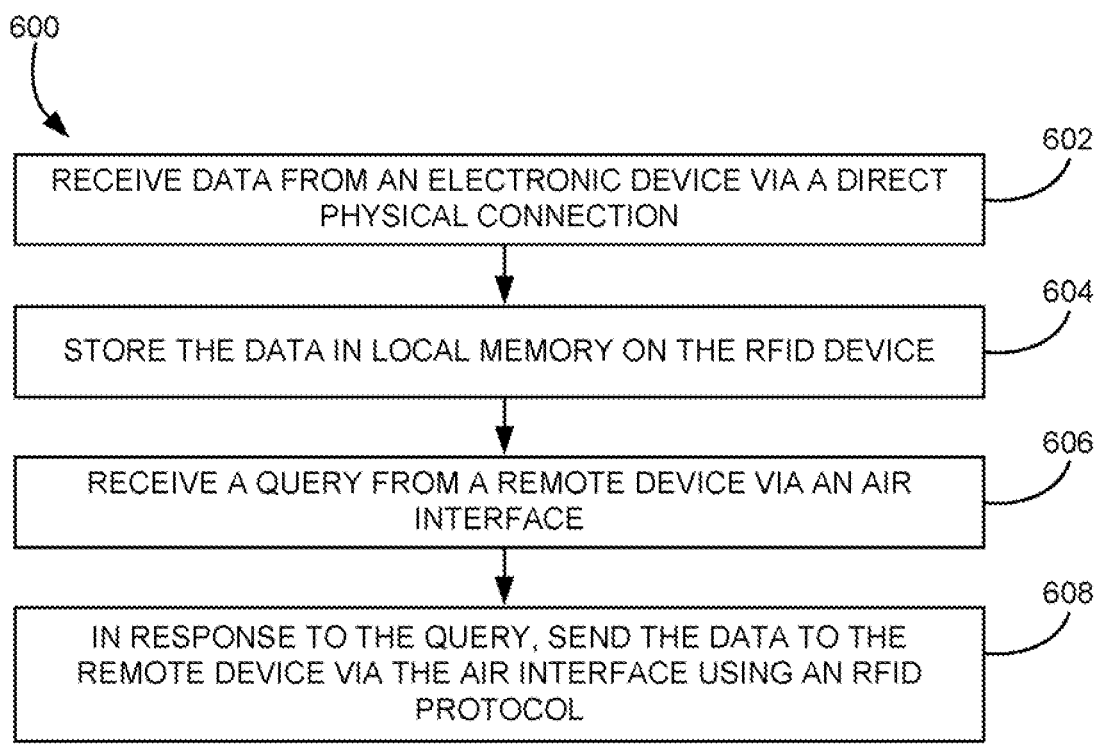
FIG. 6 is a process diagram of a method for communication between an electronic device and a remote device according to one embodiment of the present invention.

FIG. 6 depicts a method 600 for communication between an electronic device and a remote device according to one embodiment. In operation 602, data is received by the RFID device from an electronic device via a direct physical connection. In operation 604, the data, is stored in local memory on the RFID device. A flag may be set. In operation 606, a query from a remote device is received via an air interface, e.g., by RF signal. In response to the query, the data is sent to the remote device via the air interface using an RFID protocol in operation 608.

Bidirectional communication between the remote device and electronic device is also possible, either in real time or via a mailbox system. Using a mailbox system, for example, the remote device and electronic device may use an agreed-upon area in the RFID device's memory to pass messages back and forth. The remote and electronic devices may each periodically check for a flag indicating that new data has been stored in the RFID device.

As alluded to above, implementations of the inventive system may include sensors. Such implementations typically involve transfer of data from a sensor-equipped electronic device to a remote device, using the RFID device as an intermediary. However, bidirectional communication is also anticipated, for such things as a manual request for a sensor reading, for retrieval of data stored on the electronic device as opposed to the RFID device, etc.

Figure 7:
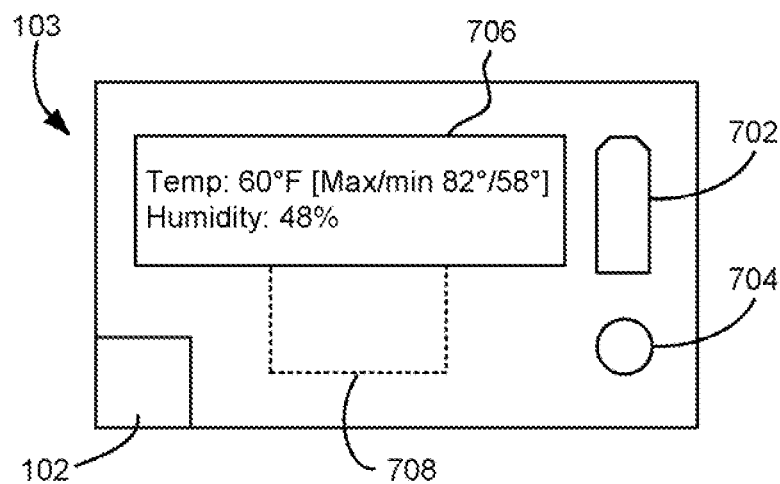
FIG. 7 is a system diagram of an electronic device with sensor capability and an optional display device according to one embodiment of the present invention.

FIG. 7 illustrates an electronic device 103 with sensor capability and an optional display device. As shown, the electronic device 103 includes one or more sensors 702, 704 for detecting one or more environmental conditions. The electronic device 103 may also include a visual display device 706. An RFID device 102 is also coupled to the electronic device 103.

The electronic device 103 can be attached to an item utilizing numerous mechanisms. For example, conventional mechanical fastening system, loop and hook-type arrangements, stitches, adhesives, as well as other known fixation techniques may be employed to permanently or temporarily attach the electronic device 103 to an item. The electronic device 103 can also be integrally formed with the item, or can be used as a stand alone device.

The sensors 702, 704 monitor the external environment in which the electronic device 103 is operating. Virtually any environmental condition can be monitored. Illustrative sensors monitor temperature, humidity, Ph, sunlight, ultraviolet light, chemicals, radioactivity, pathogens, bacteria, viruses, prions, carbon dioxide level, etc. in the environment surrounding the tag 103.

One or more of the sensors can also monitor a condition, e.g., characteristic or property, of the item to which attached, as opposed to an environmental condition. One example includes monitoring a surface temperature of the object to which attached.

The sensors 702, 704 may take readings continuously, or may take readings at some interval, such as every 5 minutes, every hour, etc. The readings can be uploaded to the RFID device memory one at a time or in batches, for later retrieval by the remote device.

The electronic device may enter hibernation state during the interval period between readings to conserve battery power.

A controller 708 on the electronic device is coupled to the sensors 702, 704 and may control the communication with the RFID device 102. The controller 708 may include one or more silicon chips, programmable microcontrollers or discrete components.

In one example of operation, assume that a large number of sensor-equipped electronic devices 103 are in the field of view of an RFID reader. Each electronic device 103 may be self energized (battery 710 or otherwise) or powered via an external power supply, e.g., AC adapter. Each electronic device 103 is interfaced digitally to an RFID chip and can activate the chip via a digital bus. The identity of each RFID device 102 coupled to an associated electronic device 103 is ascertainable via its EPC number. In operation, the electronic device 103 collects data, and periodically activates the RFID chip to store data such as sensor readings, time/date stamps, etc. in the RFID chip memory. When the RFID reader starts to collect sensor data, it activates each RFID device 102 to read its memory to retrieve data stored by the associated electronic device 103. The electronic device 103 may set a flag in the RFID chip memory, indicating presence of new data. In such an approach, the reader may first query the flag bit of the RFID chip memory.

The controller 708 may also set an alarm flag to indicate an alarm condition. Alarm conditions can be based on exceeding levels or quantities, such as passing a threshold high temperature, falling below a threshold low temperature, or detecting a certain number of viruses. Alarm conditions can also be based on historic data, such as a number of hours that the carbon dioxide level was above a threshold.

Preferably the alarm flag is one or more bits stored in memory on the electronic device or on the RFID device 102. A logic zero indicates a normal condition, while a logic one indicates an active alarm state (or vice versa). The flag preferably remains set until reset by an authorized entity.

The visual display device 706 may output a reading of the sensor, an indication of the alarm condition, etc. For example, upon the electronic device 103 detecting an alarm condition based on sensor output, the visual display device 706 is instructed or engaged to display a visual indicator of the alarm condition. For example, a visual indicator can be a simple color change, the placement of a symbol such as a circle or triangle, or can include a number of textual or graphical representations. For instance, in one embodiment an internal or external temperature sensor can be employed so that in the event that the electronic device 103 experiences a period below freezing, a visual indicator on the visual display device 706 will be on display to a user, who can quickly ascertain that an alarm condition has occurred.

As also alluded to above, implementations of the inventive system may also include displays. Such implementations may function in any mode described herein, and typically involve transfer of data from a remote device to a visual display device-equipped electronic device, using the RFID device as an intermediary. However, bidirectional communication is also anticipated, for such things as sending confirmation back to the remote device that the data has been received, that the display has been successfully updated, what the display is currently displaying, etc.

Figure 8:
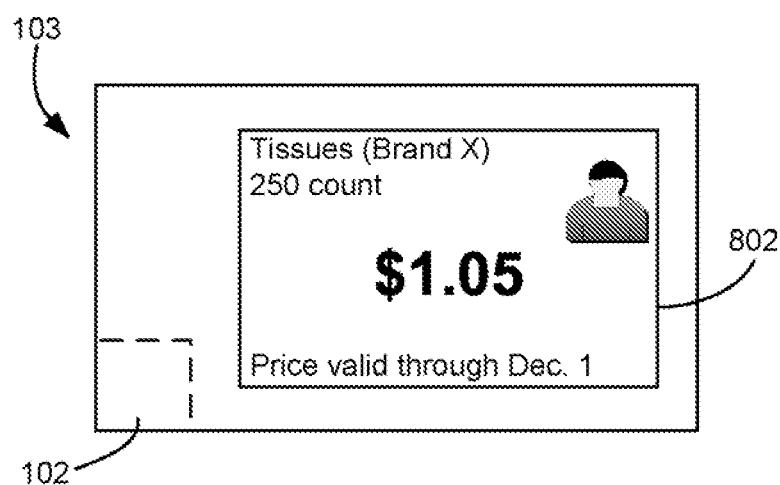
FIG. 8 is a system diagram of an electronic display device according to one embodiment of the present invention.

FIG. 8 depicts an electronic display device 103 with a visual display device 802. An RFID device 102 is in electrical communication with the electronic display device 103 via a direct physical connection. Data received by the RFID device 102 from a remote device is stored in the memory of the RFID device, the data being communicated to the electronic display device via the direct physical connection.

The data may include display data (e.g., information or graphics to be displayed), a schedule for changing the display, etc. In one embodiment, the data correlates to a value stored in a pricing system database, e.g., a price of an item. In this way, the displayed data should always correspond to the price charged for an item at the point of sale device (e.g., cash register). In other embodiments, the data includes promotional material, advertisements, photographs, video, educational material, etc. Accordingly, virtually any type of information can be displayed.

In an illustrative mode of operation, data is received by the RFID device 102 from the remote device via an air interface using an RFID protocol. The data is stored in local memory on the RFID device. The data is sent to the electronic display device 103 via the direct physical connection. The electronic display device 103 may store the data in local memory of its own.

Preferably, the electronic display device provides a confirmation that it has successfully received the data. Such a confirmation may be stored in the RFID device memory, for transmission to the remote device upon receiving a query therefrom.

As in other embodiments described herein, a flag may be set, indicating that data has been written to the RFID device memory. Setting the flag may include sending an electronic signal detectable by the electronic display device via the direct physical connection. For example, a signal may be sent to a pin of the bus, which the electronic display device detects. The electronic display device then knows to retrieve the updated data from the RFID device memory.

In another approach, setting the flag includes setting the state of a bit or bits in the RFID device memory. The electronic display device may then periodically poll the memory to determine whether the flag is set or not.

Whichever flag implementation is used, the electronic display device may periodically check the status of the flag, or it may continuously check the status of the flag. Upon transferring the data to the electronic display device, the flag may be reset.

The visual display device 802 can be any type of display device. Illustrative visual display devices include color-changing strips, electrophoretic displays, electrokinetic displays, light emitting diodes (LEDs), liquid crystal displays (LCDs), backlit displays, etc. One practicing the invention will understand that the type of visual display device 802 used may depend on the power supply to the electronic display device. If the electronic display device has a virtually unlimited power supply, e.g., is coupled to an AC adapter, then visual display devices using higher power may be used. If the electronic display device has a limited power supply, e.g., onboard battery, low power visual display devices such as LCDs and state changing electrochemical strips are preferred.

In some low-power embodiments, the visual display device 802 may be an ultra-low power display device, so as to use as little battery power as possible and thereby maximize the active life of the electronic display device. The visual display device 802 in such embodiments is preferably one that continues to display the visual indicator even after power to the display device is removed. This minimized power consumption, which is of particular importance for devices of limited battery life. One illustrative visual display device 802 includes a chemical strip that changes color upon receiving an electrical signal from a controller. The color change is permanent until reset electronically by the controller, and does not require a continuous electric current to maintain the color change.

The display media of the visual display device 802 can also be a bi-stable, non-volatile display medium. Examples of bi-stable non-volatile mediums include but are not limited to encapsulated and un-encapsulated electrophoretic material, Cholesteric materials, polymer dispersed cholesteric liquid crystals (PDChLC), encapsulated cholesteric materials, separated redox and dye reaction materials such as Dow Commotion® display medium, ph sensitive dyes, electrothermochromics displays and thermo-chromic, zenithal bi-stable, nematic, and surface stabilized ferroelectric liquid crystals.

The display media can further comprise electronic ink, wherein the electronic ink is capable of displaying a graphical representation on the visual display device 802. The term "electronic ink" as used herein is intended to include any suitable bi-stable, non-volatile material. The term "bi-stable" as used herein is intended to indicate that the particles of the imaging material can alternately occupy two stable states. For example, the particles corresponding to different pixel locations of the display assembly can alternately occupy an ON or an OFF state to form selected indicia.

Figure 9:
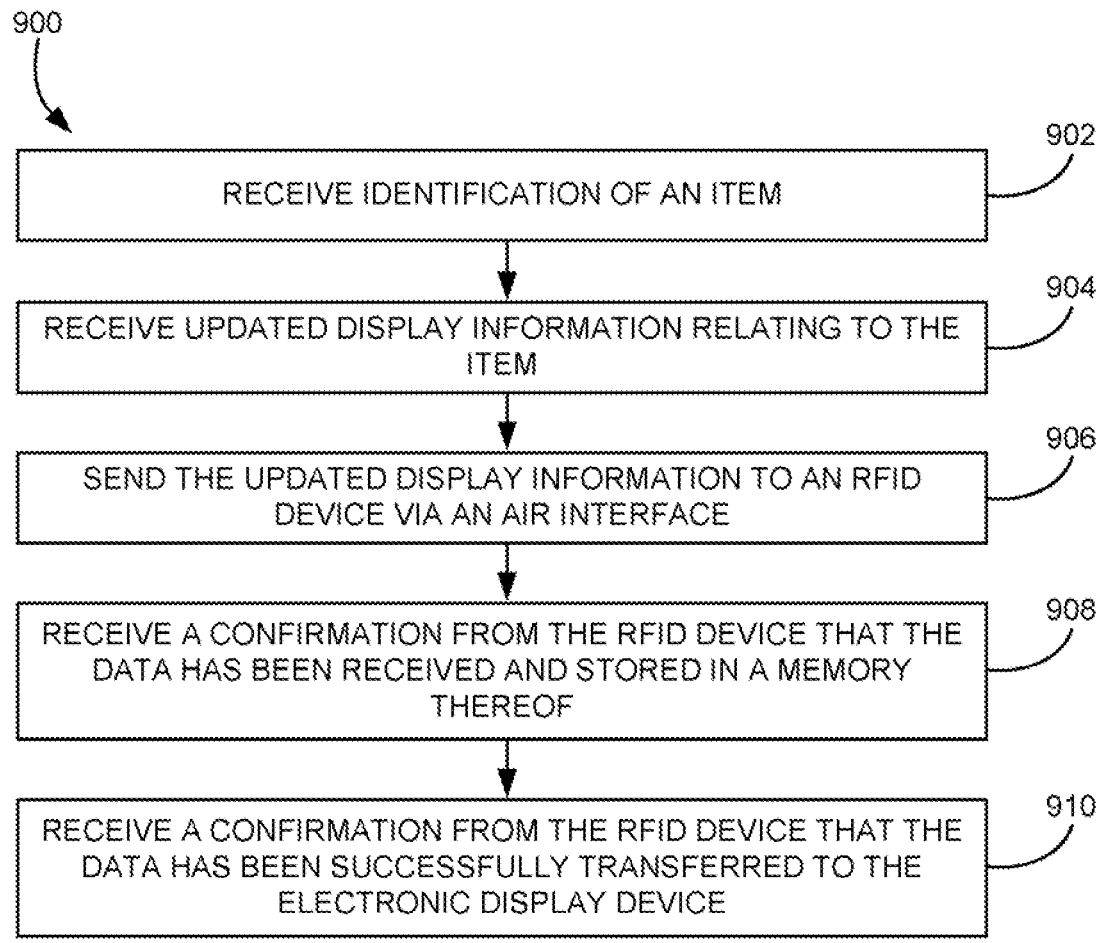
FIG. 9 is a process diagram of a method for updating an RFID-based display according to one embodiment of the present invention.

FIG. 9 depicts a method 900 for updating an RFID-based display according to one embodiment. Such a method may be executed by a computer system, handheld system (e.g., portable RFID reader), etc. In operation 902, identification of an item is received. For example, a list of items can be presented to a user on a graphical user interface, upon which the user selects a name of the item from the list. Further, the item may be identified based on a scan of a bar code associated with the item. For instance, a handheld RFID reader with integral barcode scanner can scan a barcode on the item. Additionally, the item may be identified based on an RFID-based code retrieved from an RFID tag associated with the item. For instance, a handheld RFID reader can scan the RFID tag coupled to the item to retrieve its EPC number, then correlate that EPC number to the item's identification as stored in a database.

In operation 904, updated display information relating to the item is received. This may include manual user input of alphanumeric characters, selection of graphics or video, etc.

In operation 906, the updated display information is sent to an RFID device via an air interface, for transfer to an electronic display device coupled to it.

In optional operation 908, a confirmation may be received from the RFID device that the data has been received and stored in a memory thereof.

In optional operation 910, a confirmation may be received from the RFID device that the data has been successfully transferred to the electronic display device. Such confirmation may initiate with the RFID device, or the electronic, display device.

In any of the embodiments presented herein, the display data can be updated periodically, or at will. Further, the display can time out and then change or revert to another state. For instance, the price shown on a display can be changed for a "one hour sale." Because the central pricing system may query the RFID device for the current state of the electronic display device, the new price would be charged at the point of sale.

Various implementations of the inventive system may include battery monitoring capability. Accordingly, an RFID system according to one embodiment of the present invention includes an electronic device that is powered by a battery ("battery" includes one or more batteries, disposable and rechargeable batteries, etc.), an RFID device in electrical communication with the electronic device, and a mechanism for estimating a remaining potential energy of the battery. A flag is set on the RFID device when an estimated remaining potential energy of the battery is below a predefined threshold. The flag may be a single bit, or several bits, set to a state indicative of whether an estimated remaining potential energy of the battery is below a predefined threshold. A remote device may then query the RFID device to determine whether the flag is set. If the flag indicates that the remaining potential energy of the battery is below a predefined threshold, a message may be output to a user, e.g., to indicate that it may be time to change the battery, recharge the battery, etc.

In another embodiment, the RFID device stores an indication of a condition of the battery powering the electronic device. Such indication may be a flag as above, but may also include an indication of actual usage, an estimated life remaining in the battery, whether the battery is dead, an output level of the battery, etc.

Any type of known circuitry for monitoring battery usage may be implemented. For instance, an illustrative battery monitoring circuit may keep track of an amount of time the electronic device is active, using the resulting time count to estimate whether the remaining potential energy of the battery is above or below a predetermined threshold. Illustrative battery monitoring circuits are presented below with reference to FIGS. 10-12. Another type of circuit may monitor a power level produced by the battery to estimate whether the remaining potential energy of the battery is above or below a predetermined threshold.

Figure 10:
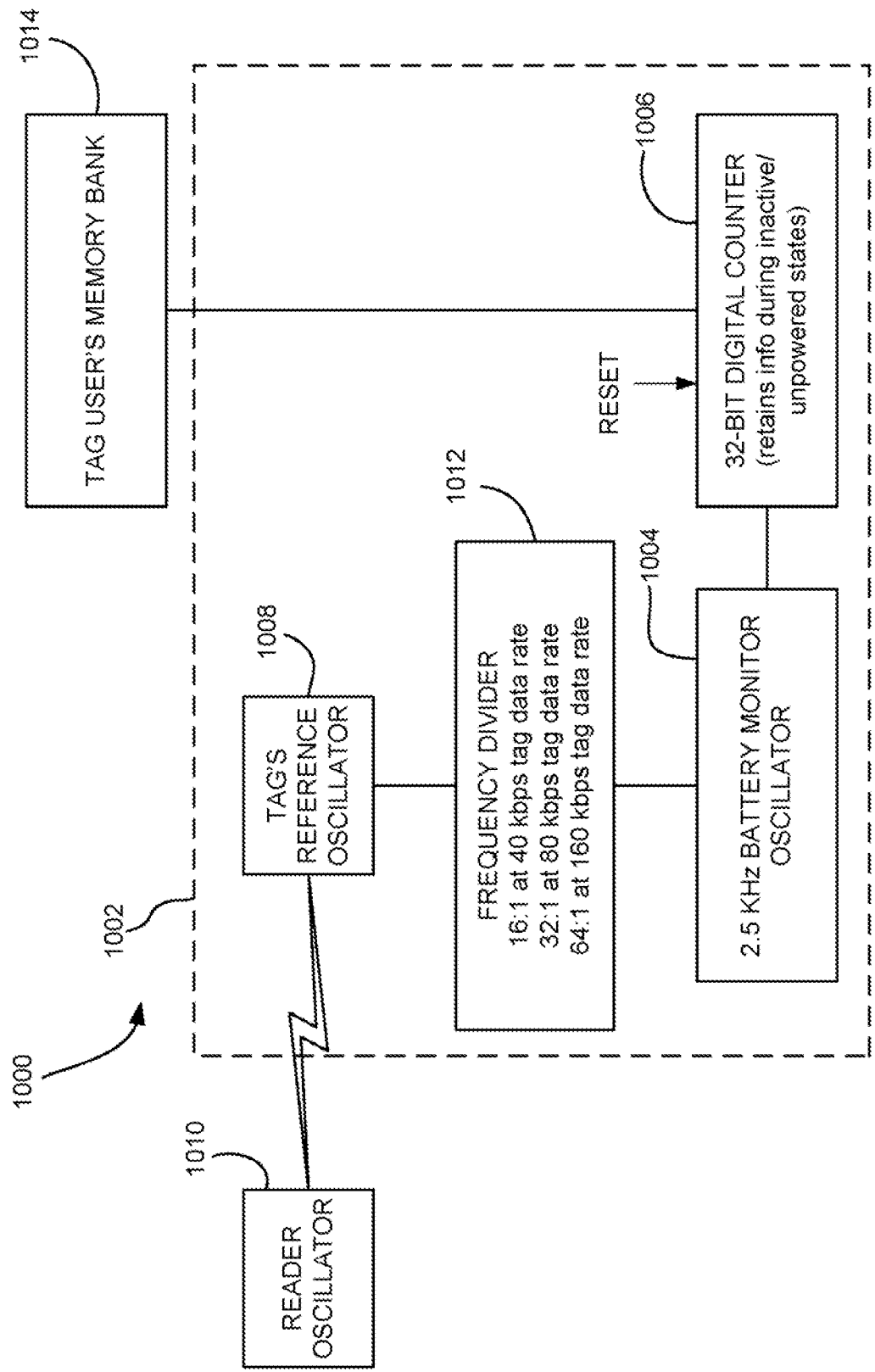
FIG. 10 is a system diagram of a system that provides intermittent battery monitoring.
Figure 11:
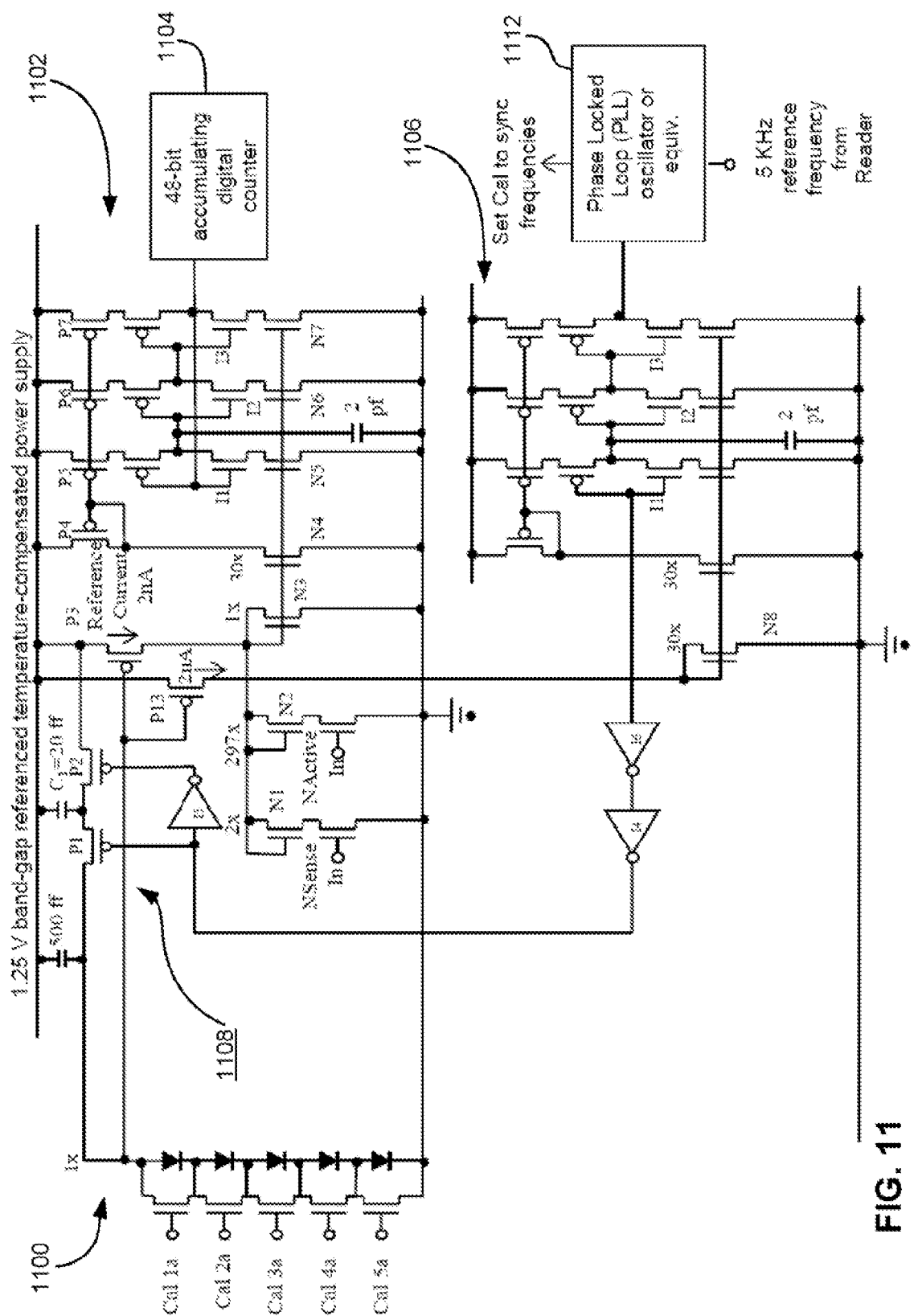
FIG. 11 is a circuit diagram of a circuit for continuous battery monitoring.
Figure 12:
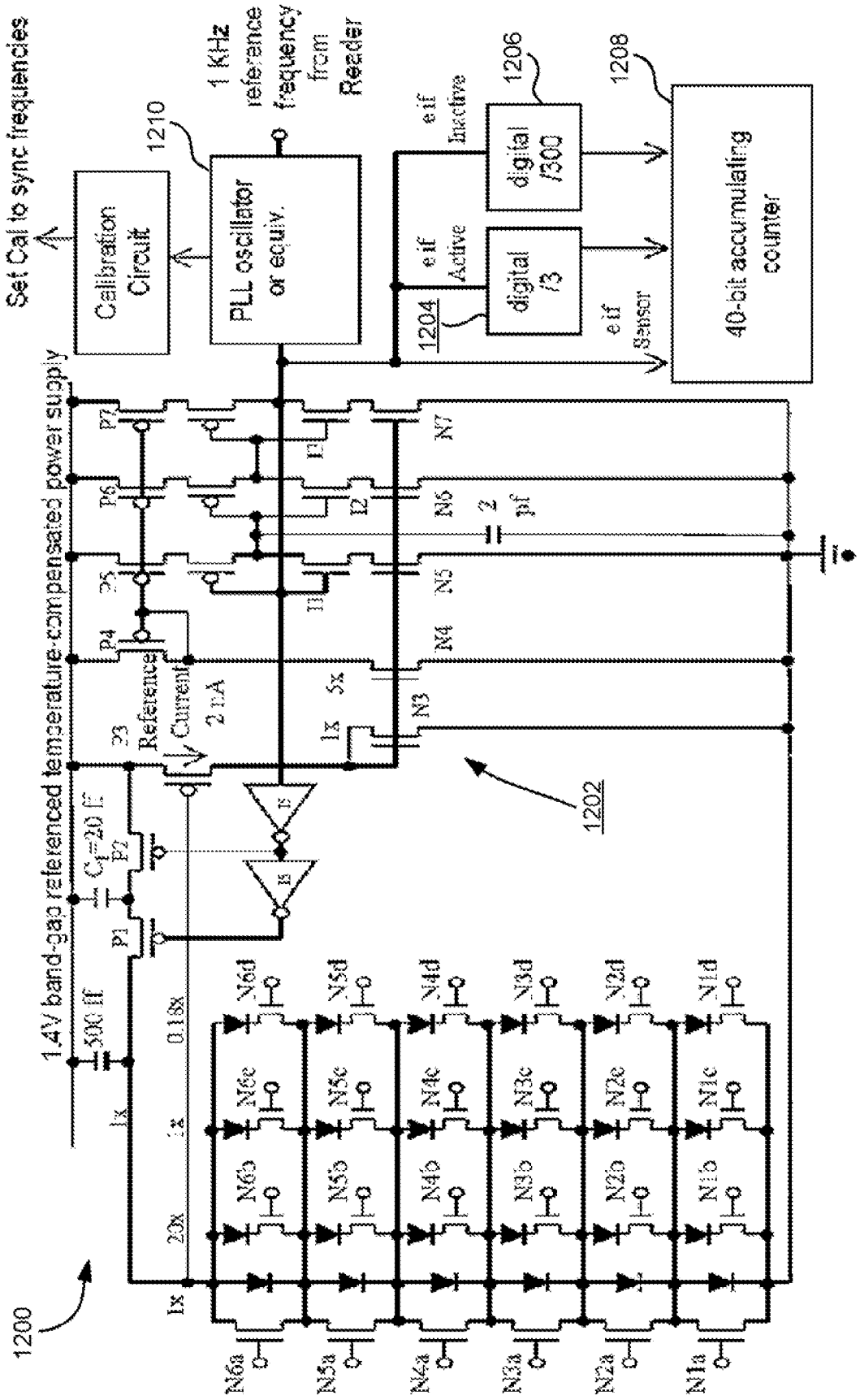
FIG. 12 is a circuit diagram of a circuit for continuous battery monitoring with automatic calibration.

The circuitry for monitoring usage of the battery may be present on the RFID device. This may require that at least a portion of the RFID device be activated while the electronic device is active. The circuitry for monitoring usage of the battery may also be present on the electronic device. Thus, while the illustrative circuits shown in FIGS. 10-12 are described as being present on the RFID device, it should be understood that the circuits may be implemented on the electronic device. Further, portions of the circuits may be divided across, present on, or shared by both devices. Accordingly, the flag may be set by the RFID device or the electronic device.

Again, while the illustrative systems shown in FIGS. 10-12 are described as being present on the RFID device, it should be understood that the systems may be implemented on the electronic device with minor modifications and without undue experimentation, as will be understood by those skilled in the art. For example, instead of counting while the RFID chip is active, a system might count while the controller of the electronic device is active. Similarly, instead of sending the count directly to a remote device, a system might send it to the RFID device.

FIG. 10 illustrates one embodiment of a system 1000 having an RFID tag battery monitor 1002 in which a mechanism, e.g., dedicated oscillator 1004, tracks the total amount of time that the tag has spent in its high-power "Activated" state. Another mechanism, e.g., counter 1006, generates a value based on the tracking, where the value can thereby be used to estimate the total power consumed by the tag. A remote device such as a reader (see FIG. 1) can query the state of this counter 1006 to accurately determine how much of the battery energy has been consumed by the tag, how much life is left in the battery and/or how many more operations can be performed before the tag's battery is exhausted.

In a simple embodiment, the battery monitor oscillator 1004 operates only when the tag is active. In this circuit 1000, the battery monitor oscillator 1004 is, using a frequency divider 1012, divided down by the ratio of 16:1 from the tag's internal oscillator 1008 (typically a 40 KHz oscillator that might be used in the C1G2 specification) that the tag uses to parse and decode data it receives from the reader. In this way, the battery monitor oscillator 1004 operates accurately at 2.5 KHz since this frequency is ultimately derived from the reader's oscillator 1010 or accurately generated on the RFID chip to an accuracy of better than ±15%. If the tag is commanded by the reader to download data at a faster rate than 40 Kbps, then the tag may increase the divider ratio for the battery monitor 1002 above 16:1 (as shown in FIG. 10) to make sure the battery monitor oscillator 1004 continues to run at 2.5 KHz. In this way, the battery monitor oscillator 1004 can provide a consistent tracking of the battery usage, regardless of data speed.

The battery monitor oscillator 1004 drives the "Battery Monitor Counter" 1006 that increments when the oscillator 1004 is running and continues to store the current cumulative count during periods when the tag is inactive or unpowered. The contents of the battery monitor counter 1006 can be read in a pre-assigned location of the optional user memory bank 1014 of the tag. In this example, the oscillator 1004 drives the counter 1006 at 2.5 KHz. The counter 1006 is preferably at least 32-bits long to make sure it never overruns its storage limit, but only the state of the 16 MSBs have to be addressable by the reader.

The divider 1012 and the resulting slow 2.5 KHz oscillation frequency of the battery monitor oscillator 1004 ensure that the power dissipation of the battery monitor circuit 1002 is negligible compared to the rest of the active power dissipation of the tag. Typical power dissipation will be only a few nanoamperes.

Those skilled in the art will understand that the simple digital frequency divider 1012 may be replaced with current mirrors and reference current sources. In a similar manner, the battery monitor 1002 need not operate at a fixed frequency but may be made to vary in proportion with the variations in the power dissipation of the RFID chip assuming that the power dissipation may vary as a function of the forward data rate, whether the tag is writing data to memory or not, whether or not the tag is operating a sensor, etc.

In a variation on the above, a second oscillator can be run during other tag states to estimate off-time usage. Note that this may require a second register to store the counts from the second oscillator. Then the reader can query both registers and estimate the remaining battery life using both active and inactive times.

Continuous Battery Monitoring with Analog Control:

In a more complex illustrative embodiment shown in FIG. 11, a tag battery monitor 1100 may also include a fixed-frequency ultra-low-power oscillator 1102 with multiple or variable frequency dividers that can divide the fixed-frequency output by varying amounts depending on whether or not the tag is in a higher-power activate state, a low-power inactive state, or other power state. As in the circuit 1002 of FIG. 10, the battery monitor circuit 1100 of FIG. 11 is designed to consume only a small fraction of the power of the chip itself so as not to significantly shorten the battery life of the tag.

In this illustrative embodiment, assume the RFID tag contains a temperature sensor and supports 3 different operating modes:
- a hibernation or "inactive" mode in which it consumes only 0.1 µA in power;
- an "activated" mode in which it exchanges data with the reader and consumes 10 µA
- a "sense" mode in which it takes and records a temperature reading and consumes 30 µA.

While the amount of time the tag will spend in each of these modes varies widely, the circuit 1100 monitors the time spent in each mode and accumulates the effect this will have on battery life.

The circuit shown in FIG. 11 contains a precision calibrated Ultra-Low-Power ("ULP") oscillator 1102 that runs at a frequency rate of only about 500 Hz and consumes only about 3 nA of power. This oscillator 1102 can run continuously which permits more accurate measurement of power consumption since it now monitors and measures inactive "hibernate" power consumption in addition to the active power consumption measured in FIG. 10. Addition of the ULP oscillator 1102 also facilitates other important tag functions like enabling a real time clock, enabling logging of temperature and other sensor data, etc.

The ULP oscillator 1102 in this embodiment consists of a Voltage Controlled Oscillator ("VCO") formed with three inverters (I1, I2, I3) connected with feedback to form a ring oscillator. The frequency of this oscillator is controlled by matched pairs of current mirrored transistors P5/N5, P6/N6, P7/N7, and a capacitor connected to the output of I1. The current flowing in these transistors is in turn controlled both by the "2 nA reference current" flowing in P3 and the analog current multiplier circuit formed by N1, N2, N3, and N4.

In the lowest-power "Inactive" mode, the tag is neither in the "Sense" nor "Active" state, and the negative-sense inputs "NSense" and "NActive" are both high. This effectively connects transistors N1, N2, and N3 in parallel at the drain of N3 for a total conductivity of $1\times+2\times+297\times=300\times$. The "1×" or "297×" here refers to the relative "size", "conductivity", or more accurately "$g_m$" of the transistors. Following standard current-mirror design practice, the effective mirror ratio is now 30×/300× which sets the currents flowing through P4 and N4 (plus each the other current mirrored transistor pairs P5/N5, P6/N6, and F7/N7) at 0.2 nA. An additional 2 pf of low-leakage non-junction capacitance is also added to the output of inverter I1 to reduce the oscillator frequency to about 500 Hz. Note that, in this "inactive" mode the power dissipation of this entire battery monitoring circuit totals only about 5 nA, which is much less than the power consumed by the tag itself.

However, when the tag enters the "active" state, transistor N2 is disconnected from the mirror circuit. This changes the current multiplier ratios as follows: the total conductivity is now 3× (1×+2×), the ratio is now 30×/3×, the P4 current has increased to 20 nA, and the VCO oscillator frequency has increased from 500 Hz to 50 KHz. Note that when the tag power dissipation increased 100× from 0.1 µA to 10 µA, the battery monitor circuit responded by increasing the counter frequency by 100× also. Also, note that although the monitor power dissipation increased to about 0.1 µA, it remains less than 1% of the total power dissipation of the chip itself.

Finally, when the tag enters the highest-power "sensor" state, transistors N2 and N3 are both disconnected from the mirror circuit. This changes the current multiplier ratios as follows: the total conductivity is now only 1×, the ratio is now 30×/1×, the P4 current has increased to 60 nA, and the VCO oscillator frequency has increased to 150 KHz. Note that when the tag power dissipation increased 300× from 0.1 µA to 30 µA, the battery monitor circuit responded by increasing the counter frequency by 300× also. Also, note that although the monitor power dissipation increased to about 0.3 µA, it remains less than 1% of the total power dissipation of the chip itself. It is well known to those skilled in the state of the art that well-designed VCO oscillators like the one shown in FIG. 11 or described in U.S. Pat. No. 4,236,199, can be accurately controlled over frequency ranges of 10,000:1 or more.

A Calibrated Ultra-Low-Power Current Source:

While the preceding discussion shows how the battery monitor circuit will work with a 2 nA reference current source, no such current sources have ever existed in the IC chip world. For example, just trying to scale a conventional PMOS transistor to source only this much current (with it's gate grounded and it's source at 1.2V) would require the channel, length to be scaled to over 100,000 microns—hardly a practical design. And in any case, the accuracy and stability of any 2 nA current source would be extremely poor without a method for accurately calibrating this current. FIG. 11 therefore includes a practical circuit for generating and calibrating the 2 nA current-source. Again, it should be stressed that the 2 nA current source specification is by way of example only, and higher and lower currents can be used with the circuit.

In FIG. 11, the calibrated current source is controlled by a replica of the first VCO that is used to drive the accumulating counter 1104, except that this reference VCO 1106 runs at a constant frequency independently of the Activate or Sense modes of operation. In this example the VCO 1106 operates at 5000 Hz, but again, it could operate at either a higher or lower frequency. The output of the reference VCO 1106 is buffered and clipped to form a square wave and used to drive P1 and P2. P1, P2 and their associated capacitors form a "switched capacitor" precision resistor 1108. The bias current flowing through this network is nominally: $I=(C1)\times(f)\times(\Delta V)=20$ ff$\times$500 Hz$\times$0.5V=50 pA. Nominally, this 50 pA bias current also flows through the calibration matrix and induces an offset voltage across the calibration matrix of 0.75V—assuming that 3 of the bypass calibration transistors are turned off. With a nominal P threshold voltage of 0.44V, then both P3 and P13 will be biased at exactly 0.01 V above their thresholds and will in theory each inject exactly 2 nA into the circuit In practice P3 and P13 (and the other mirrored transistors in the circuit) can operate either just above or below their respective threshold voltages, i.e. both can be operated in their sub-threshold region if necessary to keep the reference current low. Also in practice none of these nominal variables are well controlled, so without calibration, the resulting reference currents and oscillation frequencies might vary greatly from their nominal values due to variations in threshold voltage, temperature, and sub-threshold characteristics of both the diodes and transistors.

Accurate calibration of the current source and the oscillator frequency is therefore achieved as follows. The reader issues a "Calibration" command and sends a 5000 Hz reference tone to the tag. The tag uses a simple PLL circuit 1112 to compare the reader reference frequency with it's own reference oscillator frequency and adjusts the 5 digital inputs to the calibration matrix as necessary to force it's own reference oscillator frequency to match that of the reader. Once set, the digital calibration settings are permanently stored in memory, e.g., either EEPROM or static RAM until a reader tells the tag to re-calibrate itself.

The calibration matrix shown in FIG. 11 is digitally adjustable. The nominal maximum voltage across the calibration matrices is 1.25 V (250 mV forward bias at 50 pA for each "1×-sized" diode). Coarse adjustments of about 250 mV are made by shorting out completely one or more of the "Cal" diodes. As shown in FIG. 12, the circuit of FIG. 11 can be extended as necessary to provide digital adjustments as fine as 1 mV.

Continuous Battery Monitoring with Digital Control:

FIG. 12 shows another embodiment 1200 of the invention including a single calibrated ULP oscillator 1202 running at 1 KHz and two digital dividers 1204, 1206 to monitor time in each of the three illustrative tag power modes (Inactive, Active, Sensor) and to total the cumulative impact of operating in each of these modes on the remaining battery capacity. When operating in the "Inactive" mode the 1 KHz oscillator output is divided 300:1 before the output is fed into the 40-bit accumulating counter 1208. In the "Active" mode the reference oscillator is divided 3:1, and in the "Sensor" mode it passes directly to the accumulating counter 1208. In this circuit 1200, changes to the reference oscillator frequency are minimized, and a constant 10 pA bias current passes through P1 and P2 to the calibration matrix.

Auto-Calibration:

The calibration matrix shown in FIG. 12 is digitally adjustable with a combination of both fine and coarse adjustment bits. In this example, use of an ultra-low-bias current of only about 10 pA reduces the offset voltage across the parallel combinations of the four diodes (a,b,c,d which total 22.1× in size) to only about 200 mV. In one preferred embodiment, the tag will calibrate itself with the following simplified algorithm.

Initially all 24 of the calibration transistors are turned on and the calibration matrix is shorted out completely. The tag reference frequency will then initially exceed that of the the reader reference frequency and this fact is detected by the PLL oscillator 1212 shown in FIG. 12. In response, the calibration logic starts turning off each of the N1a, N2a, N3a . . . transistors in sequence until the PLL detects that the tag frequency has dropped below that of the reader reference oscillator (or until N1a through N6a are all off). Each disconnected "a-series" transistor increases the voltage to the gate of P3 by 200 mV. If and when the PLL detects that the tag frequency has dropped below the reader reference frequency of 1000 Hz, the calibration circuit turns the last two "a-series" transistors that it had switched off, back on. The "a-series" coarse calibration sequence is now complete.

Next, the tag begins the "b-series" calibration sequence by turning off each of the N1b, N2b . . . transistors in sequence until the PLL detects that the tag frequency has dropped below that of the reader reference oscillator (or until N1b through N6b are all off). Each disconnected "b-series" transistor decreases the size of the diode from 22.18× to 2.18×, and this increases the voltage to the gate of P3 by 60 mV. This is because the forward-current/junction-area of the diode is an exponential function of the forward voltage with a slope of about 60 mV/decade at room temperature. If and when the PLL detects that the tag frequency has dropped below the reader reference frequency of 1000 Hz, the calibration circuit turns the last two "b-series" transistors that it had switched off, back on. The "b-series" calibration sequence is now complete.

Next, the tag begins the "c-series" calibration sequence by turning off each of the N1c, N2c . . . transistors in sequence until the PLL detects that the tag frequency has dropped below that of the reader reference oscillator (or until N1c through N6c are all off). Each disconnected "c-series" transistor decreases the size of the diode from 2.18× to 1.18×, and this increases the voltage to the gate of P3 by 20 mV, based on the equation $\Delta V = (\log_{10} 2.1/1.18)(60 \text{ mv/decade}) = 20$ mV. As before, if and when the PLL detects that the tag frequency has dropped below the reader reference frequency of 1000 Hz, the calibration circuit turns the last "c-series" transistor that it had switched off, back on. The "c-series" calibration sequence is now complete.

Finally, the tag begins the "d-series" calibration sequence by turning off each of the N1d, N2d . . . transistors in sequence until the PLL detects that the tag frequency has dropped below that of the reader reference oscillator. Each disconnected "d-series" transistor decreases the size of the diode from 1.18× to 1.0×, and this increases the voltage to the gate of P3 by 5 mV, based on the following equation:

$$\Delta V = (\log_{10} 1.1/1.0)(60 \text{ mv/decade}) = 5 \text{ mV}$$

The calibration circuit then stops and locks the digital inputs to each of the calibration transistors in either EEPROM or static memory until the tag receives another "Calibration" command from the reader. The full auto-calibration sequence is now complete.

If necessary, even finer adjustments could be made by connecting even more diodes of different sizes in parallel thereby controlling the forward drop by increments as small as 1 mV. The net effect is to adjust the voltage across the calibration matrix such that at the nominal 10 pA bias current, there is just the right combination of diodes so that the input voltage to P3 is exactly what is necessary to produce the 2 nA reference current. The negative feedback employed during the calibration sequence ensures the the tag will calibrate itself accurately despite the variability in threshold voltages, leakage currents, etc.

Once calibrated, the bias voltage on the gate of P3 is maintained by negative feedback through P1 and P2. If, for example, the P3 gate voltage were to decrease, then the current through P3 would increase and the reference frequency would also increase. This would increase the current flowing through P1 and P2 which would fully restore the P3 gate voltage to the original value set by the calibration sequence.

While circuits like those shown in FIGS. 11 and 12 can achieve initial frequency and current calibration accuracies of better than ±10%, this accuracy may be degraded by changes in temperature or by subsequent variations in the power supply voltage. The best results are achieved by minimizing the variability of the power supply voltage using either a band-gap regulator or a battery power supply. In addition, the regulated power supply could compensate for both the temperature effect on the threshold voltage of P3/P13 and for the 2 mV/degree variation of the calibration diodes. If necessary, the accuracy can also be further improved by periodic re-calibration of the tag.

Additional Considerations:

To estimate the remaining life of the battery, the reader can query the tag for the value stored in the counter (or derivative of the value) and compare that value (or derivative thereof) to a benchmark value representing tag life or battery life. For instance, the reader can use an experimental average life count, of, say 7 million, and compare it to the value in the counter to estimate power usage and remaining battery life. Alternatively, the comparison may be based on some pre-defined threshold value, where the count is compared to the threshold value to determine whether the battery is at a pre-defined stage in its life.

If the user changes the tag battery, the count can be reset from the reader. Or the count can automatically reset if a battery is removed and replaced. The reader can send an alert by email, integrated display screen, computer link, etc. if a tag life is nearing its end. Similarly, the tag can include an integrated display screen, activated at user request, to show an estimated power consumption/life remaining.

Note that the methods and circuits herein could also apply to measuring the service life of the tag or electronic device, measuring tag or electronic device activity, estimating a remaining useful life of the tag or electronic device (e.g., if the circuitry is prone to a limited lifetime), etc.

Many types of devices can take advantage of the embodiments disclosed herein, including but not limited to RFID systems and other wireless devices/systems. To provide a context, and to aid in understanding the embodiments of the invention, much of the present description shall be presented in terms of an RFID system such as that shown in FIG. 1. It should be kept in mind that this has been done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

One skilled in the art will appreciate how the systems and methods presented herein can be applied to a plethora of scenarios and venues, including but not limited to automotive yards, warehouses, construction yards, retail stores, boxcars and trailers, etc. Accordingly, it should be understood that the systems and methods disclosed herein may be used with objects of any type and quantity.

Illustrative Embodiment

Following is a nonlimiting example of a system and its operation according to one embodiment of the present invention. The embodiment described is meant to illustrate one possible implementation of the teachings provided herein, and in no way should be construed as limiting.

An RFID chip is coupled to an electronic device via an I2C bus. The RFID chip contains 8 KB of memory. All memory accesses are on 16-bit word boundaries. 512 bytes are used internally by the chip, leading 7.5 KB of user memory. Memory is addressed normally through the I2C interface in that address zero accesses the first word in memory. Through the air protocol, however, the most significant eight bits of the word address are inverted before accessing memory so that air protocol address zero accesses physical address 0xff0. The 512 bytes used internally by the chip should be avoided. These 512 bytes are mapped into addresses 0x000 to 0x0ff for the I2C interface and addresses 0xf00 to 0xfff for the air interface.

Figure 13A:
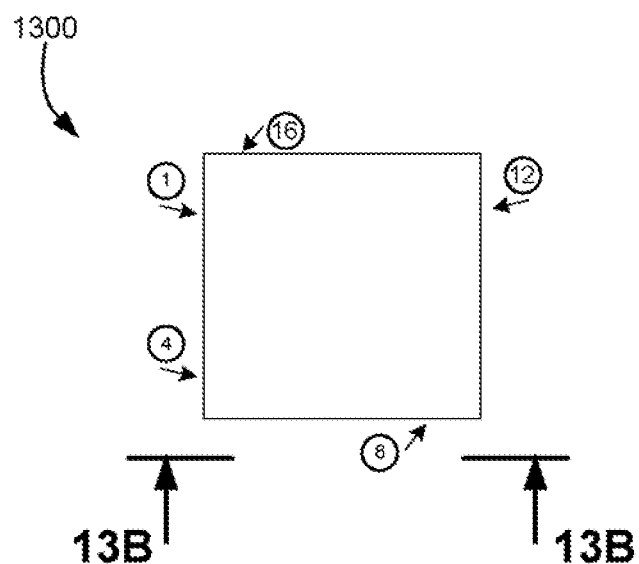
FIG. 13A is a top view of an exemplary Ultra-thin Quad Flat No-Lead (UQFN) package that may be used in conjunction with an illustrative embodiment.
Figure 13B:
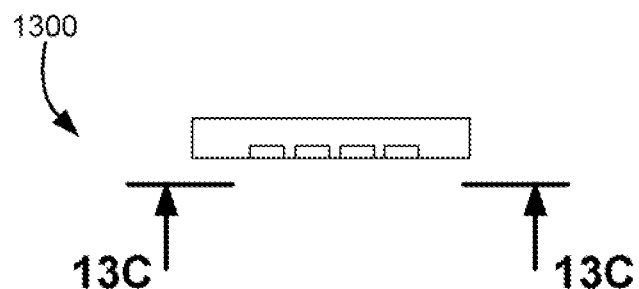
FIG. 13B is a side view of the package of FIG. 13A, taken along line 13B-13B of FIG. 13A.
Figure 13C:
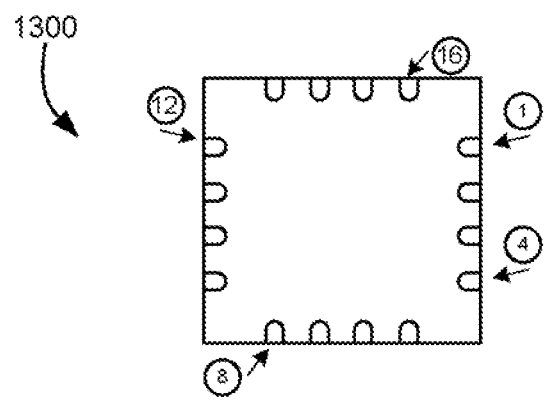
FIG. 13C is a bottom view of the package of FIG. 13A, taken along line 13C-13C of FIG. 13B.

FIGS. 13A-C illustrates an exemplary Ultra-thin Quad Flat No-Lead (UQFN) package 1300 that may be used in conjunction with this illustrative embodiment. As shown, the package has 16 pins, some of which are indicated by numerals 1, 4, 8, 12, 16 in circles. An illustrative pin out map is presented below.

Pin Out

| Pin Name | Dir | Description |
| --- | --- | --- |
| 14 VDD3V | in | 3 volt power supply pin |
| 6 VSS | in | Ground |
| 4 test_n | in | Test enable - Active Low<br>A low on this pin enables I2C communication |
| 16 e_clk | in | External Clock<br>Nominal 2.88 MHz. Clock used when in I2C communication mode. This can be a lower frequency but must be at least 5 times the I2C clock speed. |

-continued

| Pin Name | Dir | Description |
| --- | --- | --- |
| 15 probe_d | out | Digital Probe<br>This pin can be programmed to bring out internal digital signals.<br>Order the part with this pin set to bring out the ee_wr_n signal. |
| 2 I | bi | I2C data |
| 1 c | in | I2C clock<br>Maximum 720 kHz. |

I2C Communication

Communication through the I2C interface is command response. The attached electronic device writes a command to the chip and then polls using reads looking for the status flag to go high. I2C communication is enabled by pulling the test_n pin low and supplying a clock to the e_clk pin. The chip must be powered at the time, e.g., through the VDD3V pin.

Data Format

The chip expects data in a certain format. The format includes the I2C address, 16 bits reserved for future use, the data, the memory address, and the command. All commands may send all fields even if the field is not needed for the particular command. The chip follows the standard I2C format of acknowledging every 8 bits of a transmission. First the 7 bit I2C address is sent. This is fixed at I2C address 0x27. The read/write bit follows the I2C address after which the chip will acknowledge those bits by pulling the I pin low for one C clock cycle. The read/write bit is always write for a command and always read when looking for the command reply.

All I2C communication is most significant bit first for a given field. The Bits column in the following tables is in WIRE order.

Command Data Format

| Bits | Description |
| --- | --- |
| 0–7 | RFU |
| 8–15 | RFU |
| 16–23 | Data least significant byte<br>Bit 16 (the 16$^{th}$ bit sent after the address and read/write bits) is the most significant bit of the least significant byte of the 16 bit data word. |
| 24–31 | Data most significant byte |
| 32–39 | Memory address least significant byte |
| 40–43 | Command code (sent together with bits 44–47 in one 8 bit group)<br>0 - NOP<br>1 - Write Memory Word<br>2 - Read Memory Word<br>3 - 0xF RFU and factory only |
| 44–47 | Memory address most significant nibble. (sent together with bits 40–43 in one 8 bit group) |

Reply Data Summary

| Bits | Description |
| --- | --- |
| 0 | Status Flag<br>0 - requested command not complete<br>1 - requested command complete and data (if any) is valid |
| 1–7 | RFU |
| 8–15 | RFU |
| 16–23 | Data most significant byte |
| 24–31 | Data least significant byte |

Handshaking with a Reader
Simple Reader to Tag Protocol

If all that is required is for the reader to be able to write a fixed amount of data to the electronic device, the following steps may be used:

1. The electronic device monitors the probe_d pin and counts the number of words being written. There will be one low-going pulse per 16 bit write.
2. The reader writes the data to a known place in the tag memory, for example starting at address 0x000.
3. Once the electronic device sees the correct number of pulses on the probe_d pin, it places the tag in I2C communication mode by setting test_n low and supplying a clock to the e_clk pin.
4. The electronic device sends the correct number of read commands through the I2C bus starting at address 0xff0 gathering the expected number of words. Keep in mind that the eight most significant bits of the address may need to be decremented when crossing from address 0xfff to address 0xfe0.
5. It then returns the tag to normal operation mode by setting test_n high.

Reader to Tag Protocol with an Arbitrary Number of Word Transfers

1. The electronic device monitors the probe_d pin. There will be one low-going pulse per 16 bit write.
2. The reader writes the number of words it wants to transfer to a predefined place in the tag memory for example address 0x000.
3. The electronic device then places the tag in I2C communication mode by setting test_n low and supplying a clock to the e_clk pin.
4. The electronic device sends a read command through the I2C bus, reading address 0xff0. This is the expected number of words the reader wants to transfer.
5. The electronic device writes a zero to location 0xff0 and returns the tag to normal operation by setting test_n high.
6. The reader meanwhile reads memory address 0x000 in the tag until it returns zero.
7. The reader then writes the number of words it wishes to transfer into a known place in the tag's memory for example address 0x010.
8. Once the electronic device sees the correct number of pulses on the probe_d pin, it places the tag in I2C communication mode by setting test_n low and supplying a clock to the e_clk pin.
9. The electronic device sends the correct number of read commands through the I2C bus starting at address 0xfe0 gathering the expected number of words.
10. It then returns the tag to normal operation mode by setting test_n high.

Tag to Reader Protocol

For tag to reader communication, the reader must periodically poll the tag, reading a predefined location in the tag's memory. The tag writes its data to a known place in memory. It then writes the number of words it wishes to transfer into the predefined location. Once the reader sees a non-zero value in the predefined location, it reads the number of data words from the known location. The reader then writes a zero to that location. This write operation flags the electronic device monitoring the probe_d pin that the reader has received the data.

Bidirectional Protocol

By combining protocols in the sections above entitled "Simple Reader to Tag Protocol" and "Reader to Tag Protocol with an Arbitrary Number of Word Transfers", but using different addresses for the predefined locations in each direction, a bidirectional protocol can be achieved.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) system, comprising:
    an electronic device being powered by a battery;
    an RFID device, external to the electronic device, and in electrical communication with the electronic device; and
    a mechanism for estimating a remaining potential energy of the battery, wherein a flag is set on the RFID device when an estimated remaining potential energy of the battery is below a predefined threshold, the RFID device being configured to send an indication to a remote device, upon receiving a query from the remote device, of whether the flag is set or not set,
    wherein the RFID device includes circuitry for monitoring usage of the battery, the RFID device being configured to store and output, in addition to the indication of whether the flag is set or not, an estimated life remaining in the battery and an indication of actual battery usage:
    wherein a remote device queries the RFID device to determine whether the flag is set, the RFID device being configured to send the indication of whether the flag is set to the remote device via an air interface, the indication only indicating whether the flag is set or not set;
    wherein the electronic device includes at least one of a visual display device and a sensor.

2. A system as recited in claim 1, wherein the RFID device includes circuitry for monitoring usage of the battery, the RFID device being configured to store and output, in addition to the indication of whether the flag is set or not, an estimated life remaining in the battery, and at least one of: an indication of actual battery usage, whether the battery is dead, and an output level of the battery.

3. A system as recited in claim 1, wherein a remote device queries the RFID device to determine whether the flag is set, wherein the RFID device sends the indication of whether the flag is set to the remote device via an air interface, the indication only indicating whether the flag is set or not set.

4. A system as recited in claim 1, wherein the electronic device includes circuitry for monitoring usage of the battery, the electronic device setting the flag on the RFID device, wherein the RFID device is configured to remain in a hibernation state when the RFID device is inactive and the electronic device is active, wherein the electronic device is configured to wake the RFID device from the hibernation state.

5. A system as recited in claim 1, wherein the electronic device includes at least one of a visual display device and a sensor, wherein the RFID device has an RFID energy capture circuit for at least one of recharging a battery of the RFID device, and power components of the RFID device.

6. A system as recited in claim 1, wherein the RFID device is configured to store and output, in addition to the flag, at least one of an indication of actual usage, an estimated life remaining in the battery, whether the battery is dead, and an output level of the battery; wherein the RFID device is configured to remain in a hibernation state when the RFID device is inactive and the electronic device is active, wherein the electronic device is configured to wake the RFID device from the hibernation state; wherein the electronic device includes at least one of a sensor and a visual display device.

7. A method for indicating a condition of a battery, comprising:

estimating a remaining potential energy of a battery coupled to an electronic device;

setting a flag on an RFID device when the estimated remaining potential energy of the battery is below a predefined threshold;

sending a state of the flag to a remote device via an air interface; and sending, in addition to the state of the flag, at least an estimated life remaining in the battery;

wherein the RFID device includes circuitry for monitoring usage of the battery, the RFID device being configured to store and output, in addition to the indication of whether the flag is set or not, an estimated life remaining in the battery and an indication of actual battery usage; wherein a remote device queries the RFID device to determine whether the flag is set, the RFID device being configured to send the indication of whether the flag is set to the remote device via an air interface, the indication only indicating whether the flag is set or not set; wherein the electronic device includes at least one of a visual display device and a sensor.

8. A method as recited in claim 7, wherein the RFID device is in communication with the electronic device via a direct physical connection, wherein the RFID device is external to the electronic device.

9. A method as recited in claim 7, wherein the RFID device includes circuitry for monitoring usage of the battery.

10. A method as recited in claim 7, wherein estimating the remaining potential energy of the battery comprises monitoring an amount of time the electronic device is active.

11. A method as recited in claim 7, wherein the RFID device is configured to remain in a hibernation state when the RFID device is inactive and the electronic device is active, wherein the electronic device is configured to wake the RFID device from the hibernation state.

12. A method as recited in claim 7, wherein the electronic device includes circuitry for monitoring usage of the battery, the electronic device setting a flag on the RFID device when the condition of the battery is such that an estimated remaining potential energy thereof is below a predefined threshold.

13. A method as recited in claim 7, wherein the electronic device includes at least one of a visual display device and a sensor.

14. A method as recited in claim 7, wherein the RFID device is configured to remain in a hibernation state when the RFID device is inactive and the electronic device is active, wherein the electronic device is configured to wake the RFID device from the hibernation state; wherein the RFID device is external to the electronic device; wherein the RFID device has an RF energy capture circuit for at least one of recharging a battery of the RFID device, and power components of the RFID device.

* * * * *